United States Patent Office 3,269,980
Patented August 30, 1966

3,269,980
STABILIZATION OF POLYOLEFINS WITH SULFIDES AND TERPENE REACTION PRODUCTS OF TERPENES AND PHENOLS
Claus Heuck, Hofheim, Taunus, Otto Mauz, Frankfurt am Main, Jakob Winter, Hofheim, Taunus, and Felix Schülde, Neuenhain, Taunus, Germany, assignors to Farbwerke Hoechst Aktiengesellschaft vormals Meister Lucius & Brüning, Frankfurt am Main, Germany, a corporation of Germany
No Drawing. Filed Aug. 2, 1960, Ser. No. 46,895
Claims priority, application Germany, Aug. 6, 1959, F 29,113
6 Claims. (Cl. 260—45.95)

The present invention relates to a process for improving polyolefins.

It has already been proposed to stabilize polyolefins so as to improve their age-resisting properties. To achieve this, the polyolefins are admixed with phenol derivatives which are used in admixture with thioethers that may carry substituents.

The thioethers used in such process are sulfides which may also contain several sulfur atoms per molecule. The sulfur atoms are, however, separated from one another by alkyl groups.

We have now found that polyolefins can be stabilized so as to improve their age-resisting properties by admixing those polyolefins with phenol derivatives in admixture with polysulfides which contain hydrocarbon radicals. The mixtures of phenol derivatives with polysulfides improve the age-resisting properties of those polyolefins and their resistance to ultra-violet light.

Those aliphatic polysulfides which are used in combination with phenol derivatives can be prepared in simple manner. Thus, for example, the dialkyl disulfides are prepared in known manner by oxidizing mercaptans. Dialkyltrisulfides and dialkyltetrasulfides are obtained by reacting mercaptans with monosulfur-dichloride or disulfur-dichloride or, alternatively, by reacting alkyl chlorides with sodium polysulfides. In addition to the aforesaid dialkyl polysulfides which correspond to the general formula R—$S_n$—R, wherein R represents a hydrocarbon radical containing 4–25 carbon atoms and $n$ is a whole number of 2–4, there may also be used those dialkyl polysulfides of the above formula, wherein R represents an aralkyl or aryl group.

The following compounds have, for example, been prepared $C_6H_5$—$CH_2$—$S_n$—$CH_2$—$C_6H_5$

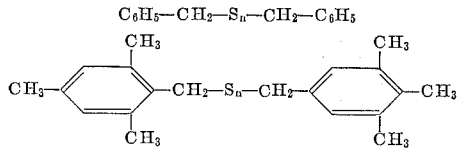

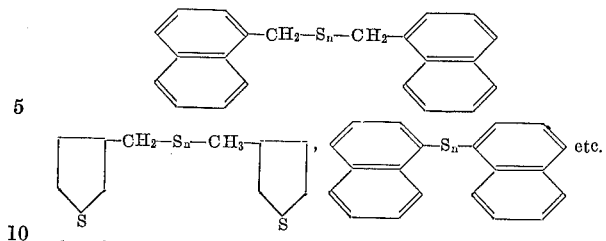

wherein $n$ is a whole number of 2–4.

The proportion in which the antiager is used generally varies within the range of 0.001% and 5%, advantageously 0.05% and 1%, in the case of shaped structures which are normally stressed. The two components, i.e. phenol derivative and polysulfide, should be used in a ratio of 5:1 parts by weight to 1:5 parts by weight, advantageously in a ratio of 1:1.

As phenolic component there may be used more especially: phenol, alkyl phenols, dialkyl phenols, wherein the alkyl radical may contain up to 12 carbon atoms, hydroquinone, resorcinol, phloroglucine and condensation products of phenol or alkyl phenols with aldehydes, formaldehyde, acetaldehyde, propionaldehyde or ketones, such as acetone. The aforesaid phenolic compounds are reacted with camphene in the presence of borofluoride-glacial-acetic acid so as to obtain corresponding terpene phenols. During that process, the camphene is rearranged and an isobornyl-compound is obtained. In addition to camphene, dipentene may be used, whereby similar types of compounds are obtained.

The tables below indicate the times until embrittlement at 140° C. for low pressure polypropylenes which always contain 0.5% of the above stabilizer combination in the ratio of 1:1. The time until embrittlement should be understood as indicating the time in days until a 1 mm. thick polyolefin pressed sheet fails on being bended.

In accordance with this invention, the polyolefins are first prepared and then stabilized by admixing them with the stabilizer components. It is, however, especially advantageous to add those stabilizer components during the work up of the polyolefins.

As polyolefins which can be stabilized by the process of this invention there may be mentioned more especially those which have been prepared by the Ziegler-type low-pressure polymerization process (cf. Raff-Allison, "Polyethylene," 1956, pages 72–81). As such compounds there may be used Ziegler-type low pressure polyethene, -propene, -butene or copolymers prepared from the corresponding monomers. Here, the polymeric compounds are formed from an olefin in the presence of a catalyst prepared from a mixture of an organo metallic compound and a compound of a heavy metal selected from the Group of IV–B to VI–B of the Periodic Table.

TABLE 1

[Stabilizer combination of 0.25% polysulfides and 0.25% of a condensation product of nonyl phenol and acetone=phenolic component. (ph. c.=abbreviation for phenolic component) (total concentration: 0.5%)]

| 0.25% polysulfide costabilizer plus 0.25% ph.c. | Total concentration, percent | Embrittlement time in days at 140° C. | Color of press plate after annealing |
|---|---|---|---|
| 0.25% bis-(octadecyl)-disulfide plus 0.25% ph.c. | 0.50 | 53 | Colorless. |
| 0.25% bis-(octadecyl)-trisulfide plus 0.25 ph.c. | 0.50 | 56 | Do. |
| 0.25% bis-(octadecyl)-tetrasulfide plus 0.25% ph.c. | 0.50 | 60 | Do. |
| 0.25% bis-(octadecyl)-mono sulfide plus 0.25% ph.c. | 0.50 | 40 | Do. |
| Condensation product of nonyl phenol and acetone (without addition of sulfide) or polysulfide. | 0.25 / 0.50 | 3 / 5 | |

The above table shows that increasing the sulfur content of dialkyl polysulfides leads to increased stability.

as phenolic component. (Total concentration of stabilzer combination: 0.5%.)

TABLE 2

| Co-stabilizer plus isobornylated cresol (ph.c.) | Total concentration, percent | Embrittlement in days at 140° C. | Color of press plate after annealing |
|---|---|---|---|
| 0.25% bis-(octadecyl)-sulfide plus 0.25% ph.c. | 0.50 | 40 | Colorless. |
| 0.25% bis-(octadecyl)-disulfide plus 0.25% ph.c. | 0.50 | 45 | Do. |
| 0.25% bis-(octadecyl)-trisulfide plus 0.25% ph.c. | 0.50 | 48 | Do. |
| 0.25% bis-(octadecyl)-tetrasulfide plus 0.25% ph.c. | 0.50 | 50 | Do. |
| Isobornylated cresol (without addition) (ph.c.). | 0.50 | 3 | Do. |

Similar results are obtained, when the octadecyl radical is replaced by the dodecyl radical. When lower alkyl radicals are used, the stability is somewhat reduced in spite of the higher sulfur content of the molecule. This is due to the less good compatibility of the polysulfide with smaller alkyl groups in the polyolefin.

Stabilizer combination of 0.25% polysulfides and 0.25% of a mixture of about 60% diisobornyl-o-cresol

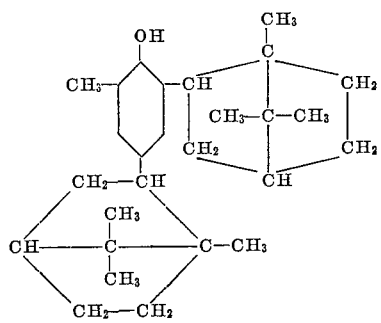

and about 40% o'- or p-mono-isobornyl-o-cresol:

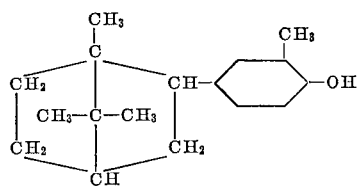

Table 2 establishes as did Table 1 that the stability is increased with an increasing content of sulfur.

Stabilizer combination of 0.25% polysulfides and 0.25% of a condensation product of camphene and 1,2,4-xylenol=ph.c.

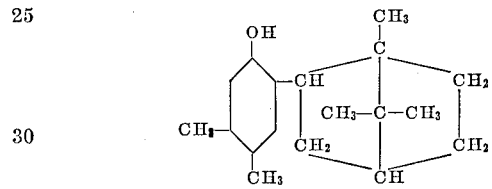

o-isobornyl-1,2,4-xylenol and

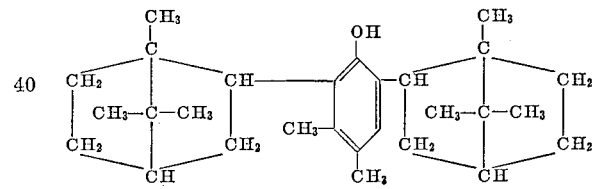

o,o'-diisobornyl-1,2,4-xylenol

TABLE 3

| 0.25% co-stabilizer plus 0.25% condensation product of camphene and 1,2,4-xylenol (ph.c.) | Total concentration, percent | Embrittlement in days at 140° C. | Color of press plate after annealing |
|---|---|---|---|
| 0.25% bis-(octadecyl)-sulfide plus 0.25% ph.c. | 0.50 | 5 | Colorless. |
| 0.25% bis-(octadecyl)-disulfide plus 0.25% ph.c. | 0.50 | 17 | Do. |
| 0.25% bis-(octadecyl)-trisulfide plus 0.25% ph.c. | 0.50 | 29 | Do. |
| 0.25% bis-(octadecyl)-tetrasulfide plus 0.25% ph.c. | 0.50 | 30 | Do. |
| 0.5% ph.c. alone | 0.50 | 1 | Slightly yellowish. |

TABLE 4

[Stabilizer combination of 0.25% dialkyl polysulfides and 0.25% 2,6-di-tert-butyl-p-cresol=ph.c. as phenolic component]

| 0.25% co-stabilizer plus 0.25% 2,6-di-tert-butyl-p-cresol (ph.c.) | Total concentration, percent | Embrittlement in days at 140° C. | Color of press plate after annealing |
|---|---|---|---|
| 0.25% bis-(octadecyl)-sulfide plus 0.25% ph.c. | 0.50 | 8 | Colorless. |
| 0.25% bis-(octadecyl)-disulfide plus 0.25% ph.c. | 0.50 | 13 | Do. |
| 0.25% bis-(octadecyl)-trisulfide plus 0.25% ph.c. | 0.50 | 18 | Do. |
| 0.25% bis-(octadecyl)-tetrasulfide plus 0.25% ph.c. | 0.50 | 24 | Do. |
| 0.50% 2,6-di-tert-butyl-p-cresol=ph.c. | 0.50 | 1 | Do. |

The values obtained in Tables 3 and 4 for the time until embrittlement are slightly inferior to those obtained in Tables 1 and 2. However, Tables 3 and 4 show clearly that the stabilizing effect is increased as is the content of sulfur in the molecule.

We claim:
1. A composition of matter comprising
   (a) a member selected from the group consisting of a mixture of 60% of diisobornyl-o-cresol and 40% of o-mono-isobornyl-o-cresol, a mixture of 60% of di-isobornyl-o-cresol and 40% of p - mono - isobornyl-o-cresol, o - isobornyl - 1,2,4 - xylenol, o-diisobornyl-1,2,4-xylenol, and 2,6-di-tertiary-butyl - p - cresol,
   (b) a solid polymer prepared by reacting a member of the group consisting of ethylene, propylene, butylene, and mixtures thereof in the presence of a catalyst prepared from a mixture of an organo metallic compound and a compound of a heavy metal selected from the group of IVB to VIB of the Periodic Table, and
   (c) orogano polysulfides having the formula

$$R-S_n-R$$

wherein R is a radical selected from the group consisting of alkyl radicals, arylalkyl radicals and aryl radicals, the radicals containing 4 to 25 carbon atoms, and $n$ is a whole number from 2 to 4, said phenol and sulfide compounds being present in an amount of 0.001 to 5% by weight of the composition in a ratio of 5:1 to 1:5 parts by weight.

2. The composition of matter of claim 1 wherein the polysulfide is a bis-(octadecyl) disulfide.

3. The composition of matter of claim 1 wherein the polysulfide is a bis-(octadecyl)trisulfide.

4. The composition of matter of claim 1 wherein the polysulfide is a bis-(octadecyl) tetrasulfide.

5. A solid homopolymer of propylene containing stabilizing amounts of stabilzer combination consisting of 2,6 ditertiary butyl p-cresol and a compound having the formula $R-(S)_nR$ wherein R is a radical selected from the group consisting of alkyl radicals, arylalkyl radicals and aryl radicals, the radicals containing 4 to 25 carbon atoms and $n$ is an integer from 2 to 4.

6. A composition of matter comprising a solid polymer of an alpha monolefin selected from the group consisting of ethylene, propylene and butylene and a stabilizing amount of a stabilizer combination consisting of (a) a reaction product of monocyclic monhydric phenol with camphene and (b) polysulfide having the formula $R-(S)_nR$ wherein R is a radical selected from the group consisting of alkyl, aralkyl and aryl radicals having from 9 to 16 carbon atoms and $n$ is an integer from 2 to 4 and wherein said combination of (a) and (b) are in a ratio of between 0.5 to 1 and 2 to 1.

References Cited by the Examiner

UNITED STATES PATENTS 2,967,847   1/1961   Hawkins et al. _____ 260—45.7
3,020,259   2/1962   Schulde et al.

FOREIGN PATENTS 572,920   3/1959   Canada.
1,201,217   7/1959   France.

LEON J. BERCOVITZ, *Primary Examiner.*

WILLIAM H. SHORT, ALFONSO D. SULLIVAN, MILTON STERMAN, JOSEPH R. LIBERMAN, S. H. BLECH, H. W. HAEUSSLER, H. E. TAYLOR,
*Assistant Examiners.*